(12) United States Patent
Fukuwa

(10) Patent No.: US 7,439,690 B2
(45) Date of Patent: Oct. 21, 2008

(54) DISCHARGE LAMP LIGHTING APPARATUS AND DISCHARGE LAMP LIGHTING METHOD

(75) Inventor: Shinji Fukuwa, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 11 days.

(21) Appl. No.: 11/276,557

(22) Filed: Mar. 6, 2006

(65) Prior Publication Data

US 2006/0197473 A1    Sep. 7, 2006

(30) Foreign Application Priority Data

Mar. 4, 2005    (JP) .............................. 2005-060777

(51) Int. Cl.
    *H05B 37/02*    (2006.01)
(52) U.S. Cl. ...................... 315/308; 315/360
(58) Field of Classification Search ............ 315/209 R, 315/224, 225, 226, 291, 307, 308, 360, DIG. 7, 315/DIG. 5
See application file for complete search history.

(56) References Cited

U.S. PATENT DOCUMENTS

| | | | | |
|---|---|---|---|---|
| 5,140,229 A | * | 8/1992 | Yagi et al. ................... | 315/307 |
| 5,142,203 A | * | 8/1992 | Oda et al. .................... | 315/308 |
| 5,151,631 A | * | 9/1992 | Oda et al. .................... | 315/127 |
| 5,481,163 A | * | 1/1996 | Nakamura et al. ........... | 315/308 |
| 5,485,061 A | * | 1/1996 | Ukita et al. .................. | 315/307 |
| 6,163,115 A | * | 12/2000 | Ishizuka ....................... | 315/308 |
| 6,583,587 B2 | * | 6/2003 | Ito et al. ...................... | 315/308 |
| 6,693,393 B2 | * | 2/2004 | Konishi et al. .............. | 315/224 |
| 6,960,886 B2 | * | 11/2005 | Ishizuka ....................... | 315/80 |
| 7,002,305 B2 | * | 2/2006 | Kambara et al. ............. | 315/291 |
| 2004/0090188 A1 | * | 5/2004 | Ishizuka et al. ............. | 315/291 |

FOREIGN PATENT DOCUMENTS

JP    2003338393    11/2003

* cited by examiner

*Primary Examiner*—Thuy Vinh Tran
(74) *Attorney, Agent, or Firm*—Cermak Kenealy & Vaidya LLP

(57) ABSTRACT

A lighting control technology for a discharge lamp can be capable of suppressing start-up variations of luminous flux in consideration of variations in lamp voltage. A discharge lamp lighting apparatus can include a lamp voltage detection circuit and a lamp current detection circuit for detecting a lamp voltage and a lamp current of a discharge lamp, respectively. The lamp can include a control circuit for performing a starting-time control for applying a current or power several times as high as a rated value of the lamp in order to light the discharge lamp substantially instantaneously, and a stable-time control for lighting the discharge lamp stably at substantially constant rated power. The lamp current or lamp power can be controlled from a starting time to a stable time in accordance with the voltage value detected by the lamp voltage detection circuit. The starting-time control can be switched to the stable-time control depending on an increase in the voltage value detected by the lamp voltage detection circuit from the starting time to the stable time and depending on a lapse of an arbitrary time.

17 Claims, 8 Drawing Sheets

Example of Conventional Power Control on Mercury-containing HID Lamp

Example of Voltage Detected of Mercury-free HID Lamp

Examples of Conventional Power Control on Mercury-free HID Lamp (A) With Low Lamp Voltage (B) With Average Lamp Voltage (C) With High Lamp Voltage Examples of Power Control According to Exemplary Embodiment (A) With Low Lamp Voltage (B) With Average Lamp Voltage (C) With High Lamp Voltage

DISCHARGE LAMP LIGHTING APPARATUS AND DISCHARGE LAMP LIGHTING METHOD

This application claims the priority benefit under 35 U.S.C. §119 of Japanese Patent Application No. 2005-060777 filed on Mar. 4, 2005, which is hereby incorporated in its entirety by reference.

BACKGROUND OF THE INVENTION

1. Field

The disclosed subject matter relates to technology for an apparatus and a method for lighting a discharge lamp including a vehicle headlamp with improved start-up variations in luminous flux.

2. Description of the Related Art

FIG. 1 is a diagram showing an example of circuit configuration of a conventional discharge lamp lighting apparatus (for example, see Japanese Patent Laid-Open Publication No. 2003-338393). This conventional discharge lamp lighting apparatus (hereinafter, also referred to simply as lighting apparatus) exemplifies the case where the discharge lamp is used as a vehicle headlamp, and is started with a starting current several times as high as the rated current for the sake of instantaneous lighting.

The conventional lighting apparatus has a DC/DC converter 2, a DC/AC inverter 3, and a starting transformer 4. The DC/DC converter 2 boosts a direct-current voltage input from a direct-current power supply 1. The DC/AC inverter 3 converts the boosted input from direct-current to alternating-current. The starting transformer 4 generates a high-voltage starting pulse for making a discharge lamp 5 start to discharge at the time of lighting. A lamp power control circuit 8 controls the boosting of the DC/DC converter 2 in accordance with values detected by a lamp voltage detection circuit 6 and a lamp current detection circuit 7.

Note that the circuits described above are intended for alternating-current lighting. To light the discharge lamp 5 with a direct current, the DC/AC inverter 3 is omitted from the circuit configuration.

By the way, the direct-current boosting circuit (DC/DC converter 2) contains a lighting control circuit which controls the lamp current or lamp power according to the lamp voltage from the start to stabilization of the discharge lamp 5.

More specifically, the lighting control circuit determines the set value of the lamp power through calculation. The lighting control circuit then controls the lamp power of the direct-current boosting circuit based on a supply output control method such as pulse width modulation (PWM). As above, the lighting control circuit of the discharge lamp lighting apparatus intended for automobile illumination is provided with a PWM or other control circuit that detects the lamp voltage and performs feedback control so that the lamp power has the predetermined set value. Then, in this discharge lamp lighting apparatus, the control circuit for lighting the discharge lamp instantaneously detects the lamp voltage and the lamp current and performs feedback control based on those values, thereby controlling the lamp power from immediately after start-up to stabilization.

The reason why such a control as described above is performed here will be described below. Ordinary discharge lamps including a mercury lamp take a long time to reach sufficient brightness. To brighten the lamps earlier, the lamp currents can be increased for quick start-up at the initial phase of lighting. Subsequently, the lamp currents at the initial phase of lighting should be reduced to the rated currents as the discharge lamps increase in brightness. Here, at the initial phase of lighting, the discharge lamps have the characteristic that the lamp voltages immediately after cold start are as low as 20 V or so, and the lamp flux as low as 10% to 20% or so as compared to during stable time operation.

In general, discharge lamps experience a rise in lamp voltage and lamp flux as their lamp tube temperatures increase. In order to achieve a required intensity of illumination quickly, discharge lamps are subjected to so-called warm-up currents that are several times as high as their rated currents while the lamp voltages are still low immediately after start-up.

Due to these warm-up currents, the discharge lamps quickly increase in tube temperature. The discharge lamps experience a sharp rise in the values of both the lamp voltage and the lamp flux accordingly. At this rise of luminous flux, the lamp voltage and the lamp flux show almost the same tendencies upward with a minor difference in time. That is, when the lamp voltage is low, the flux is also in a low state. When a maximum warm-up current is passed, the lamp voltage rises and the lamp flux gradually rises as well. Then, the lighting control circuit performs a control operation to reduce the lamp current that is higher than the rated current at the time of warm-up, into the stable rated value in accordance with the rise in the values of the lamp voltage and lamp flux (lamp current reduction control).

Now, in view of environmental concerns in recent years, so-called mercury-free HID (High Intensity Discharge) lamps, which are capable of lighting without containing mercury, have been under development.

Now, description will be given of differences between the lighting controls on conventional HID lamps and mercury-free HID lamps.

FIG. 2 is a diagram showing an example of conventional power control on a mercury-containing HID lamp. In conventional HID lamps, the lamp voltage immediately after start-up is 20 V or so while the lamp voltage rises up to around 85 V at stable time. The lamp voltage characteristics immediately after start-up and at stable time thus have a difference in value. In conventional HID lamps, it is therefore easily possible to determine the state of the lamp voltage, whether it is a value corresponding to a time immediately after the start of lighting or at a stable time, even if some range of variations in the actual lamp voltage is taken into account. It has thus been possible to control the lamp current appropriately according to the state.

In contrast, mercury-free HID lamps show a lamp voltage of 25 V or so immediately after start-up, and as low as 42 V even at stable time. The voltage difference therebetween is thus smaller than in the conventional HID lamps described above. Besides, in mercury-free HID lamps, the range of variations of the lamp voltage at stable time is as large as ±20% or so with respect to the rated lamp voltage. Thus, for mercury-free HID lamps it is hard to determine which state they are in, immediately after start-up or at stable time, based on the difference in the lamp voltage.

Consequently, it has been difficult to control the lamp current according to the situation, and by extension to perform an appropriate warm-up control on the flux start-up, when mercury-free HID lamps are subjected to the conventional power control.

By the way, while the warm-up current is applied to a discharge lamp as described above, the control circuit detects the lamp voltage in order to perform power control from the starting-time power to the stable-time power. Typically, this lamp voltage is not directly detected from across the lamp to which a high-voltage pulse of 20 kV or so is applied at starting time, but detected so as to include the starting transformer for generating the high-voltage pulse, which is connected in series to the discharge lamp. The reason for this is that it is difficult to detect a voltage from the point where the starting pulse is applied. Here, the inductance of the starting transformer may cause some errors. Depending on the direct-current bias characteristic, however, impedance errors caused by the inductance have only a minor effect since the discharge lamp of instantaneous start type is typically lit by a rectangular wave having a low frequency of several hundreds Hz.

Nevertheless, the mercury-free HID lamp shows a resistance of 3 to 5Ω, combining a winding resistance resulting from the warm-up current at starting time and an ON resistance of the bridged inverter FET in the prior stage (DC/AC inverter 3). Then, the mercury-free HID lamp requires a lamp voltage of 25 V or so immediately after start-up, when a maximum starting current of 3 A or above must also be applied. In consideration of the foregoing, the above resistances produce errors of 9 to 15 V in addition to the lamp voltage. Under these circumstances, it has been difficult to detect the lamp voltage accurately during the warm-up control of the mercury-free HID lamp. This makes the starting-time control on the mercury-free HID lamp difficult to optimize appropriately by means of the lamp voltage. This is also shown from the fact that the current increases and the errors increase as the lamp voltage decreases. The mercury-free HID lamp has a stable-time lamp voltage as low as 42 V, or approximately half that of the mercury-containing HID lamp.

It has thus been difficult to determine which state the mercury-free HID lamp is in, starting time or stable time, because of the foregoing characteristics as well as the fact that the detection values of the lamp voltage in the two states have little difference if the resistor-based errors mentioned above are included in the detection values of the lamp voltage. It has thus been extremely difficult to perform power control on the mercury-free HID lamp based on the lamp voltage at the time of starting the lamp.

FIG. 3 is a chart showing an example of the voltage detected for mercury-free HID lamps. In FIG. 3, the lamp voltage is around 25 V immediately after start-up, with variations of around ±5 V lamp by lamp. From this FIG. 3, it can be seen that it is extremely difficult to perform appropriate start-up control when the starting power is controlled in accordance with the lamp voltage as mentioned above, due partly to detection errors of the lamp voltage.

FIGS. 4A to 4C are diagrams showing examples of conventional power control on a mercury-free HID lamp. FIGS. 4A, 4B, and 4C show the cases where the lamp voltage is low, average, and high, respectively.

In general, when a mercury-free HID lamp is subjected to start-up control according to the lamp voltage, the lamp voltage itself has a range of variations of 10 V or so immediately after the start of a discharge. As indicated above, the stable-time lamp voltage can be as low as 42 V. Suppose that the conventional start-up control is applied to the mercury-free HID lamp without considering the above-noted variations. For example, the lamp of FIG. 4A, having a lamp voltage of 20 V immediately after start-up, undergoes a maximum current for a relatively long period with respect to the lamp of FIG. 4B, having a lamp voltage of 25 V immediately after start-up as a reference. On the other hand, the lamp of FIG. 4C, having a lamp voltage of 30 V immediately after start-up, undergoes a maximum current for a relatively short period. If the start-up control is thus performed on the mercury-free HID lamp without considering the variations, large variations in the flux start-up characteristic can occur. The mercury-free HID lamp thus has had the problem that the variations, if any, can cause both excessive warm-up with the result of luminous flux overshoot, and insufficient warm-up with the result of slow start-up.

SUMMARY

The disclosed subject matter provides a technology for performing lighting control on a discharge lamp, which can suppress start-up variations of lamp flux in consideration of variations in lamp voltage.

A discharge lamp lighting apparatus and a discharge lamp lighting method according to several aspects of the disclosed subject matter can be configured as follows. A discharge lamp lighting apparatus can include a lamp voltage detection circuit for detecting a lamp voltage of a discharge lamp, a lamp current detection circuit for detecting a lamp current of the discharge lamp, and a control circuit for performing a starting-time control for applying a current or power several times as high as a rated value thereof in order to light the discharge lamp instantaneously, and a stable-time control for lighting the discharge lamp stably at constant rated power. The lamp current or lamp power can be controlled from a starting time to a stable time in accordance with a voltage value detected by the lamp voltage detection circuit, and the starting-time control can be switched to the stable-time control depending on an increase in the voltage value detected by the lamp voltage detection circuit from the starting time to the stable time and depending on a lapse of an arbitrary time.

The above discharge lamp lighting apparatus may further include a timer for determining the lapse of the arbitrary time since the discharge lamp is lit. In this case, the timer may have different time constants for charging and discharging, respectively, where the time constant for charging is greater than the time constant for discharging.

In the above discharge lamp lighting apparatus, during control from the starting time to the stable time of the discharge lamp, a lamp current detecting signal from the lamp current detection circuit can be fed back to the lamp voltage detection circuit to apply a bias voltage.

A discharge lamp lighting apparatus can also include a lamp voltage detection circuit for detecting a lamp voltage of a discharge lamp, a lamp current detection circuit for detecting a lamp current of the discharge lamp, and a control circuit for performing a starting-time control for applying a current or power several times as high as a rated value thereof in order to light the discharge lamp instantaneously, and a stable-time control for lighting the discharge lamp stably at constant rated power. The lamp current or lamp power can be controlled from a starting time to a stable time in accordance with a voltage value detected by the lamp voltage detection circuit, and during control from the starting time to the stable time, a lamp current detecting signal from the lamp current detection circuit can be fed back to the lamp voltage detection circuit to apply a bias voltage.

A discharge lamp lighting apparatus can also include an application unit for applying a voltage and a current to a discharge lamp, a detecting unit for detecting a lamp voltage and a lamp current to be applied to the discharge lamp, a control unit for performing a starting-time control for controlling a value of the current or power to a predetermined value exceeding a rated value thereof based on the lamp voltage, and a stable-time control for controlling the value of the lamp current so that the current or power has the rated value. The lamp can include a switching unit for switching between the starting-time control and the stable-time control when the lamp voltage reaches or exceeds a predetermined voltage value and a predetermined time has elapsed since lighting.

A discharge lamp lighting method can include applying a voltage and a current to a discharge lamp, detecting a lamp voltage and a lamp current to be applied to the discharge lamp, performing a starting-time control for controlling a value of the current or power to a predetermined value exceeding a rated value thereof based on the lamp voltage, and a stable-time control for controlling the value of the lamp current so that the current or power has the rated value, and switching between the starting-time control and the stable-time control when the lamp voltage reaches or exceeds a predetermined voltage value and a predetermined time has elapsed since lighting.

A discharge lamp lighting method can make a computer execute the abovementioned steps. Furthermore, a program can make a computer execute the abovementioned steps.

In addition, a computer-readable recording medium can have a program for making a computer execute the abovementioned steps.

Accordingly, it is possible to improve start-up variations of luminous flux ascribable to variations in lamp voltage. In particular, improvement in the flux start-up characteristics of mercury-free HID lamps can be realized.

BRIEF DESCRIPTION OF THE DRAWINGS

These and other characteristics and features of the disclosed subject matter will become clear from the following description with reference to the accompanying drawings, wherein.

DETAILED DESCRIPTION OF EXEMPLARY EMBODIMENTS

Hereinafter, exemplary embodiments of the disclosed subject matter will be described with reference to FIGS. 5 to 9B. The present invention makes it possible to light mercury-free HID lamps substantially instantaneously by suppressing start-up variations of luminous flux ascribable to characteristic differences of the lamps, even when the lamps which have low lamp lighting voltages and relatively large voltage variations are used as lamps, for example, in a vehicle lamp such as a headlamp.

Figure 1:
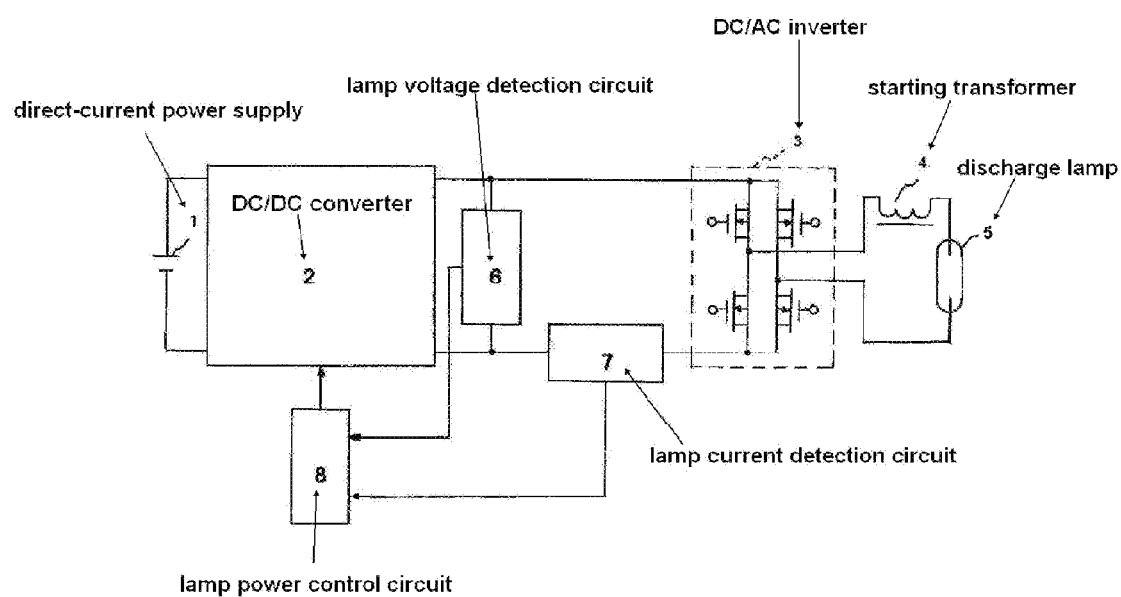
FIG. 1 is a block diagram showing the circuit configuration of a conventional discharge lamp lighting apparatus.
Figure 2:
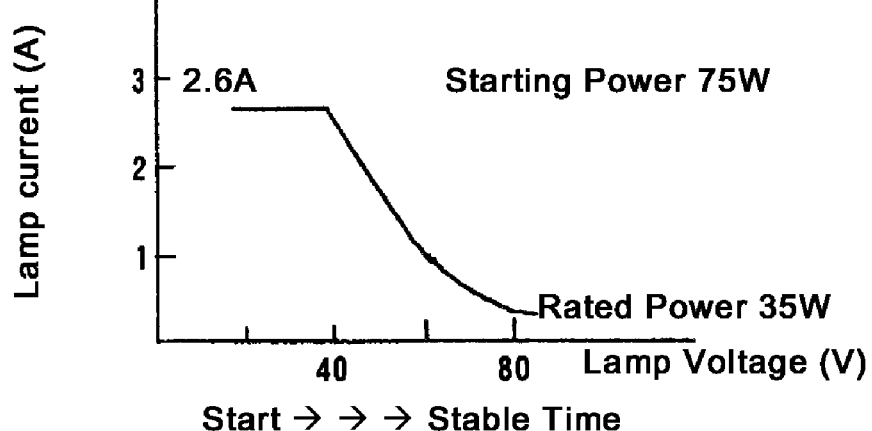
FIG. 2 is a diagram showing an example of conventional power control on a mercury-containing HID lamp.
Figure 3:
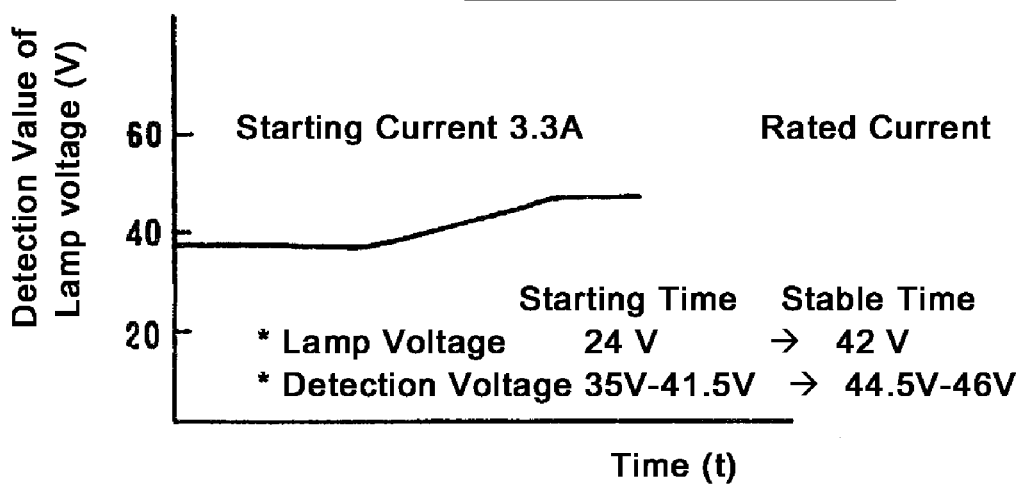
FIG. 3 is an explanatory diagram showing an example of voltage detected of mercury-free HID lamps.
Figure 4:
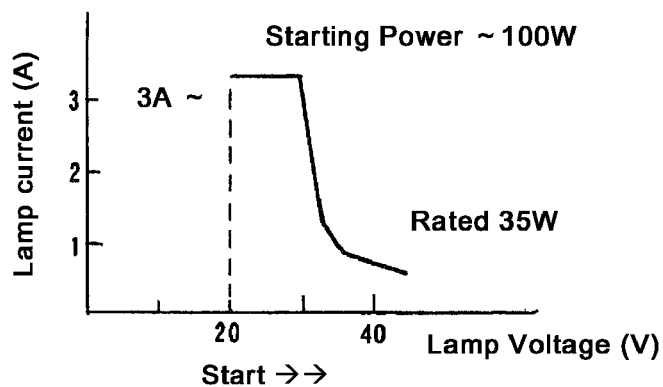
FIGS. 4A to 4C are diagrams showing examples of conventional power control on mercury-free HID lamps.
Figure 4:
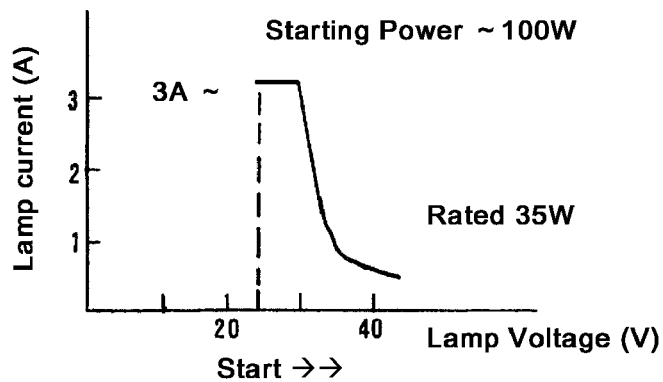
Figure 4:
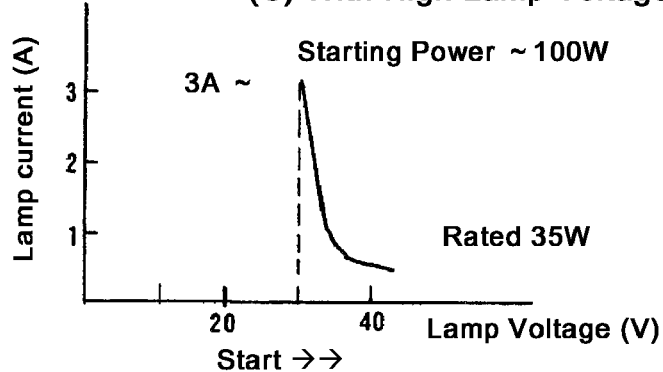
Figure 5:
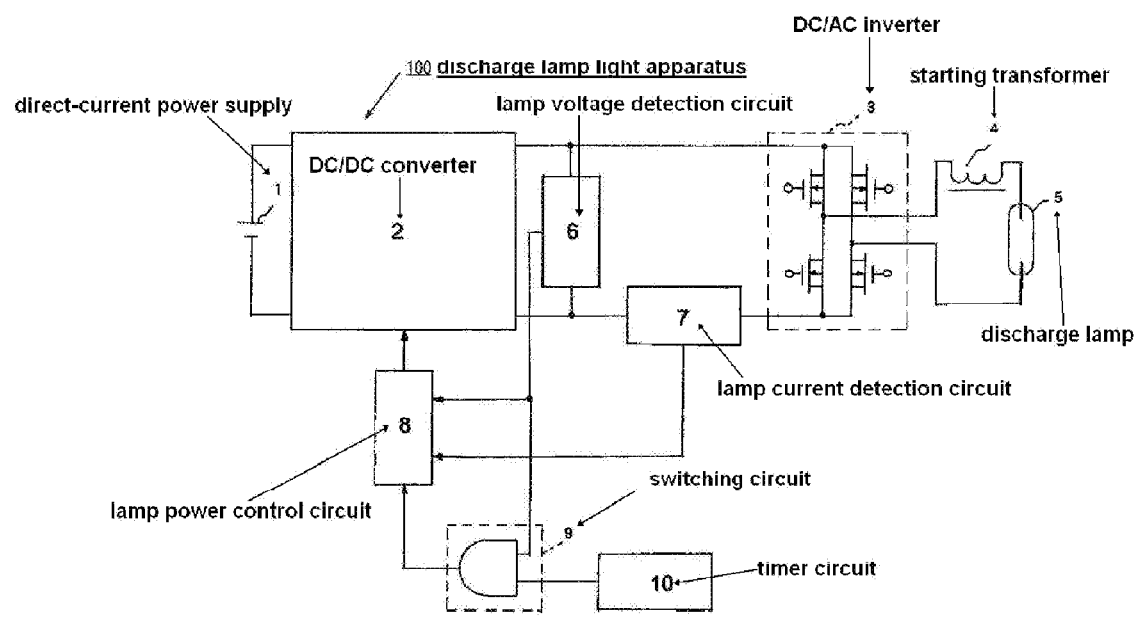
FIG. 5 is a block diagram showing the circuit configuration of a first exemplary embodiment made in accordance with principles of the invention.

FIG. 5 is a block diagram showing the circuit configuration of a discharge lamp lighting apparatus according to a first exemplary embodiment. Here, the same reference numerals as those in FIG. 1 represent identical or similar components as those in FIG. 1.

The discharge lamp lighting apparatus 100 can include a lamp voltage detection circuit 6 and a lamp current detection circuit 7 on the output side of a DC/DC converter 2 which boosts the voltage of a battery 1. In addition, the discharge lamp lighting apparatus 100 can include an existing lamp power control circuit 8. This lamp power control circuit 8 can establish a lamp current target value, and control the output of the DC/DC converter 2 in accordance with the lamp voltage from start-up to stable time so that the detection value of the lamp current coincides with the lamp current target value. The discharge lamp lighting apparatus 100 can also include a switching circuit 9. This switching circuit can switch control on the current of the lamp (discharge lamp 5) after the lamp is lit by a starting transformer 4. Here, the switching circuit 9 can exercise switching from a so-called starting current control (hereinafter, also referred to as warm-up control) for supplying a current or power exceeding its rated value (for example, between one and several times as high as the rated value), necessary for warming up the lamp in accordance with the value of the lamp voltage, to a control for maintaining the constant rated power at stable time (hereinafter, also referred to as stable-time control). The discharge lamp lighting apparatus 100 can further include a timer circuit 10 for controlling the switching timing of this switching circuit 9 based on a determination as to the elapsed time after lighting.

The timer circuit 10 is intended to improve variations in the start-up characteristic of luminous flux, which arise from variations in lamp voltage from immediately after the start-up of the lamp to stable time and while warm-up control is performed on the lamp according to the lamp voltage.

For the operation of flux start-up control, the lamp power control circuit 8 initially performs a warm-up operation to control the starting lamp current in accordance with the lamp voltage from immediately after start-up to the stabilization of the lamp. Lamps have inherent variations in lamp voltage. For example, when the lamp voltage after start-up is higher than usual, it thus follows that the starting-time control begins with the state that the lamp voltage has already risen to some degree immediately after the start-up as compared to when the lamp voltage is low. In other words, when the warm-up control is performed based on the lamp voltage alone, starting from a high lamp voltage would advance the timing for reducing the lamp current in the initial phase of the warm-up control. This could cause a lack of current and power that are originally required for the start-up control at the time of warm-up.

The timer circuit 10 can be configured to prevent such variations in lamp voltage (the lamp voltage having a range of variations because of differences in characteristics etc.) which may cause a lack of current and power necessary for the starting-time control for warm-up. More specifically, the timer circuit 10 can be configured to delay the timing of the operation for switching until an arbitrary time has elapsed. For example, the timer circuit 10 can delay a switch from the starting-time control (which can be configured to apply a current or power exceeding the rated value thereof at the starting time) to the stable-time control (which can be configured to maintain the constant rated power in the stable time with the intervention of the reduction control for reducing the power according to an increase in lamp voltage).

The timer circuit 10 for determining the lapse of the arbitrary time since the discharge lamp 5 is lit has different time constants for charging and discharging, respectively. Here, the time constant for charging is greater than the time constant for discharging.

Conventionally, the start-up control circuit of a discharge lamp capable of instantaneous lighting has two control domains, or a reduction control domain and a stable-time control domain. In the reduction control domain, the starting power is controlled by reducing the maximum warm-up current and power necessary in the starting time in accordance with a rise in lamp voltage. In the stable-time control domain, the rated power at the stable time is maintained after the reduction control. A sharp drop in power across this transition of control can cause flux undershoot (i.e., the amount of luminous flux is reduced to a possibly undesirable level). For the purpose of avoiding this undershoot, the discharge lamp lighting apparatus 100 can be configured to shift from the warm-up control to the stable-time control with gradual delays after the rise of the lamp voltage, thereby delaying the power reduction control in time. Nevertheless, even if the time delay of the power reduction control is used to compensate for the lack of power which occurs when mercury-free HID lamps having higher lamp voltages rise in flux, mercury-free HID lamps starting with lower lamp voltage also undergo the same operation of delaying the power reduction control in time as those of higher lamp voltages do. As a result, to compensate for the lack of power, the use of the time delay of the power reduction control produces flux overshoot with lamps of lower lamp voltages. Consequently, it is difficult to improve start-up variations of luminous flux ascribable to characteristic differences in lamp voltage fundamentally by conventional means of delaying the reduction control alone.

Then, in the discharge lamp lighting apparatus of the exemplary embodiment, the delay at the time of transition of control can be rendered constant so as to avoid undershoot. In the meantime, the control domain can be switched from the starting-time control to the stable-time control at such timing that the lamp voltage reaches or exceeds a set value and an arbitrary time has elapsed from start-up. Then, the discharge lamp lighting apparatus carries out the switching of the control at this timing, thereby suppressing the start-up variations of luminous flux ascribable to variations in lamp voltage.

Description will now be given of the time setting for the foregoing timer to perform switching with. Given a low lamp voltage at starting time, the time setting is determined so that the amount of the lack of warm-up power occurring from a high starting lamp voltage can be compensated if circuit settings allow an appropriate starting-time control. When the switching timing is thus set appropriately, the time setting of the timer elapses during the original warm-up control period if the start-up lamp voltage is low. Since the control switching operation is not performed until the lamp voltage reaches the set voltage, the resulting start-up characteristic is appropriate for controlling a given low lamp voltage. The switching of the timer like this delays the control switching operation as compared to ordinary lamps, thereby improving the start-up characteristics with the given low lamp voltage.

Figure 6:
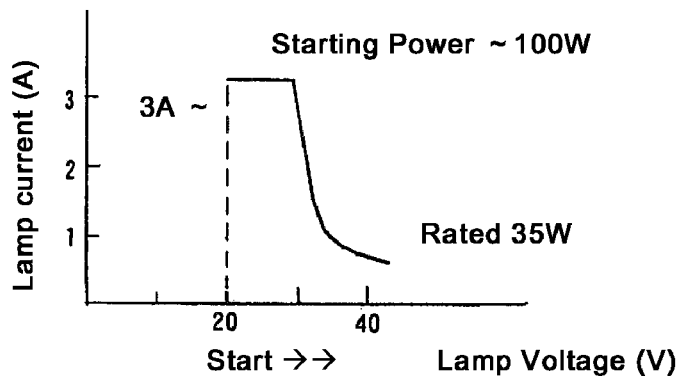
FIGS. 6A to 6C are diagrams showing examples of power control according to the exemplary embodiment of FIG. 5.
Figure 6:
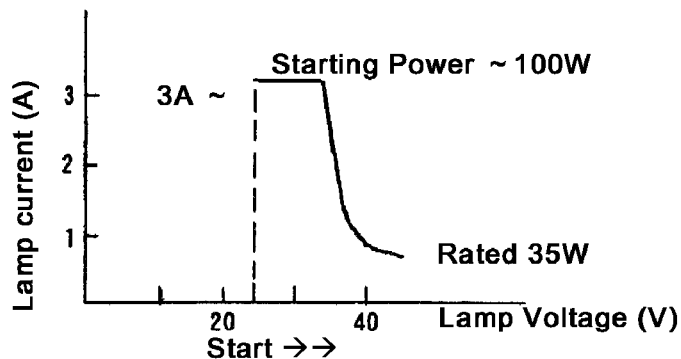
Figure 6:
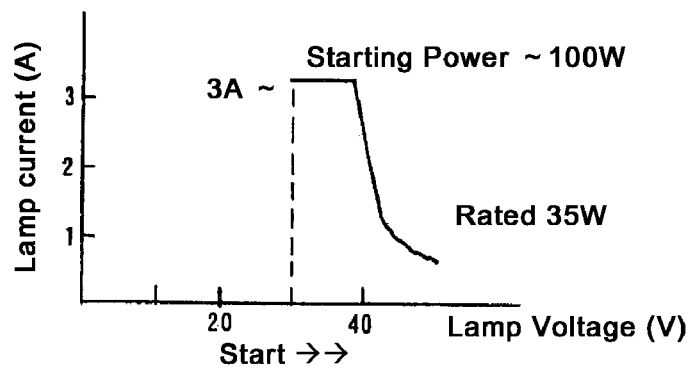

Provided a high lamp voltage at starting time, the timer circuit 10 extends the period of the starting current. This precludes lack of power and makes the start-up power appropriate. Consequently, in the exemplary embodiment, the starting-time control becomes less susceptible to variations in lamp voltage as compared to the conventional control where control is effected based on the lamp voltage alone. This can result in the appropriate start-up voltage, an example of which result is shown in FIG. 6.

Figure 8:
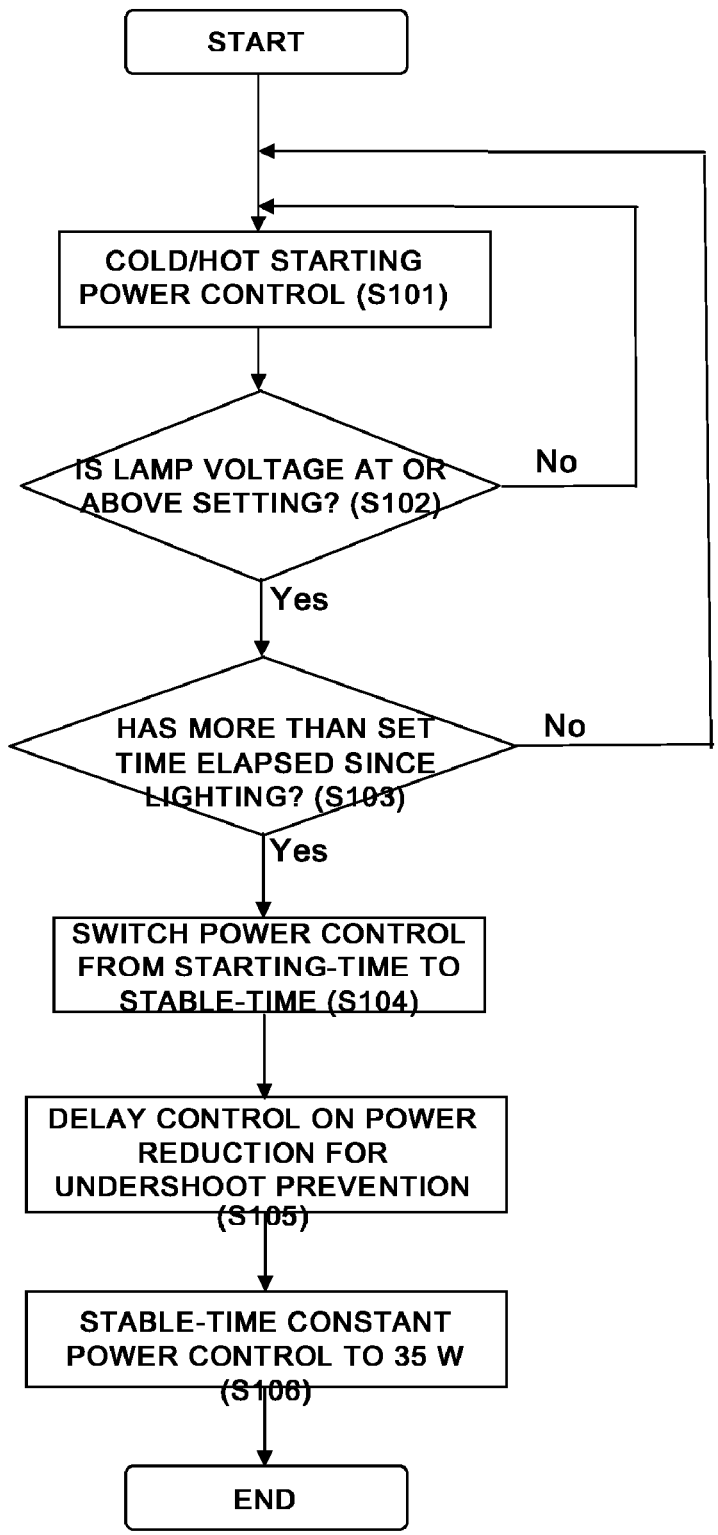
FIG. 8 is a flowchart showing the control of an exemplary embodiment.
Figure 9:
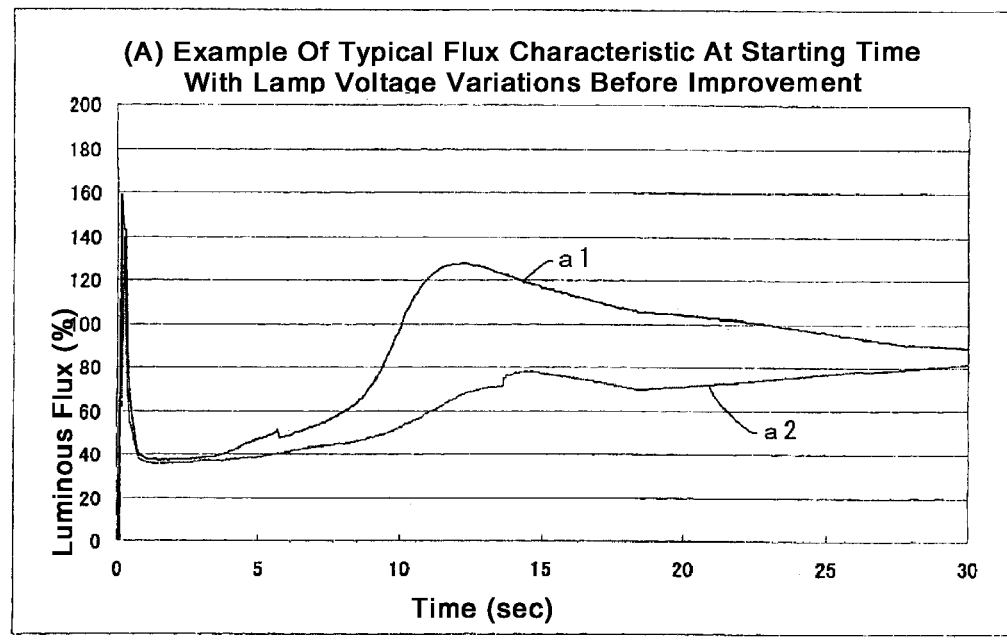
FIGS. 9A and 9B are graphs for comparing characteristic variations of the start-up fluxes of mercury-free HID lamps before and after the application of the starting-time control according to an embodiment of a discharge lamp lighting apparatus having a timer circuit.
Figure 9:
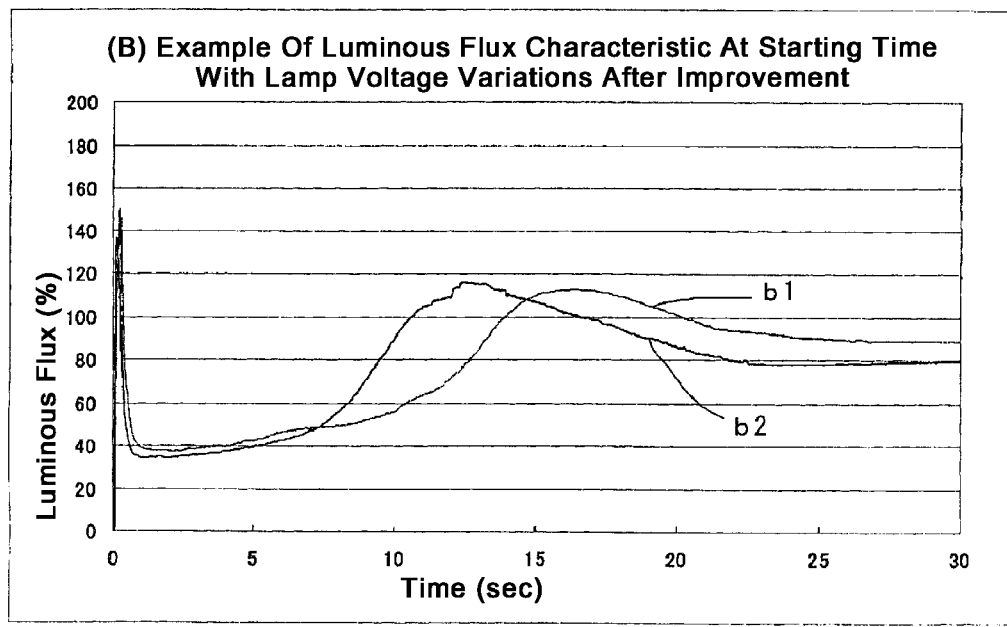

FIG. 8 is a control flowchart for a discharge lamp lighting apparatus. Under the flowchart, the discharge lamp lighting apparatus 100 switches the starting-time control for maximizing the lamp power in accordance with the lamp voltage after the lamp is started until it enters a stable time, to the stable-time control for maintaining the constant rated power.

For warm-up or starting-time control upon starting the lamp, the discharge lamp lighting apparatus supplies the maximum current to the lamp (S101). When the lamp is started, the timer circuit 10 simultaneously starts measuring the lapse of time after the lighting.

To switch from the starting-time control to the stable-time control, the switching circuit 9 determines whether or not the lamp voltage has risen to reach the set voltage (S102). If the lamp voltage is lower than the set voltage, the lamp power control circuit 8 continues the starting-time control.

If the lamp voltage reaches or exceeds the set voltage, the switching circuit 9 determines whether or not a predetermined time has elapsed since the lighting (S103). If the time elapsed after the lighting is shorter than the predetermined time, the lamp power control circuit 8 continues the starting-time control.

If both the conditions of S102 and S103 are satisfied, the switching circuit 9 switches from the starting-time control to the stable-time control (S104).

The lamp power is also reduced by switching from the starting power to the stable-time power. Here, the lamp power control circuit 8 performs delay control, i.e., delays the reduction control in time so that the power decreases gradually so as to prevent an excessive decrease (undershoot) of the flux (S105). Then, after the completion of the switching to the stable-time control and the delay control on the power reduction for undershoot prevention, the lamp power control shifts to the stable-time control for maintaining the rated power (e.g., 35 W) (S106).

FIGS. 9A and 9B are graphs for comparing characteristic variations before and after the application of the starting-time control by the discharge lamp lighting apparatus having the timer circuit 10. The measurements are of the start-up fluxes for a mercury-free HID lamp having a relatively low lamp voltage and one having a relatively high lamp voltage upon cold start. FIG. 9A shows an example of the conventional starting-time flux characteristics occurring from typical variations in lamp voltage. FIG. 9B shows an example of the starting-time flux characteristics occurring from variations in lamp voltage, using the control of the present exemplary embodiment.

Referring to FIG. 9A, a comparison between the start-up fluxes of an HID lamp a1 having a low lamp voltage and an HID lamp a2 having a high lamp voltage shows that the conventional starting-time control does not have a sufficient effect on the high-lamp-voltage HID lamp a2, with the result of low flux.

In contrast, as shown in FIG. 9b, the starting-time control of the above-described exemplary embodiment reduces the variation (difference) between the start-up fluxes of an HID lamp b1 having a low lamp voltage and an HID lamp b2 having a high lamp voltage as compared to the conventional technology.

From FIGS. 9A and 9B, it is shown that the application of the starting-time control provides the effect of improving large variations in the starting-time flux characteristic ascribable to differences in lamp voltage.

The foregoing operation is for situations where the lamps are cold, i.e., for so-called cold start. To restart lamps that are turned off but yet to be cooled, i.e., at the time of hot or warm start, the timer circuit 10 can perform the following starting-time control. That is, in hot or warm start, the lamps are started at temperatures higher than in cold start. If the same control as in cold start is performed, the warm-up control is thus continued even after the lamps reach the temperatures above which the stable-time control may originally be performed. This delays the switching to the stable-time control and feeds the high warming-up power to the lamps excessively. As a result, hot or warm start can cause flux overshoot.

For such situations, the timer circuit 10 can provide time constants for charging and discharging separately. More specifically, in order to perform the warm-up control as long as appropriate in hot or warm start, the timer circuit 10 is configured so that it can set the duration of the warm-up control (the lamp voltage at the beginning of start-up) according to the lapse of time after turnoff. Consequently, the timer circuit 10 can avoid a delay in the control-switch timing from occurring during hot or warm start.

To be more specific, respective different time constants for charging and discharging may be provided by making the charging time constant greater than the discharging time constant of the timer-switch timing. The timer circuit 10 thus establishes different time constants for charging and discharging, respectively, whereby its timer capacitor is prevented from being fully discharged during hot or warm start in which the turnoff period is short and the lamp is not cooled perfectly. By so doing, the timer circuit 10 can set the switching time at the beginning of start-up according to the lapse of time after turn-off, so that the warm-up control is performed as long as appropriate during hot or warm start. As a result, the timer circuit 10 can reduce the time for switching from the starting-time control to the stable-time control, and suppress flux overshoot as well.

As above, according to the present exemplary embodiment, it is possible to improve (suppress) start-up variations of luminous flux ascribable to variations in lamp voltage which occur when flux start-up control is performed based on the lamp voltage.

FIGS. 6A to 6C are diagrams showing basic examples of the power control according to the disclosed subject matter. FIGS. 6A, 6B, and 6C show the cases where the lamp voltage is low, average, and high, respectively.

In the examples of conventional control, the period for applying the starting current decreases as the lamp voltage after start-up becomes higher due to variations in lamp voltage. According to the above described embodiments, differences in the period of application of the starting current can be improved, which makes the duration of the starting-time control on the current or power uniform irrespective of the voltage. Consequently, it is possible to improve/suppress start-up variations of luminous flux through stabilization of the starting current and power.

Next, description will be given of another exemplary embodiment which is a discharge lamp lighting apparatus having the timer circuit 10 according to the first exemplary embodiment, further including a circuit for correcting detection errors in lamp voltage.

Figure 7:
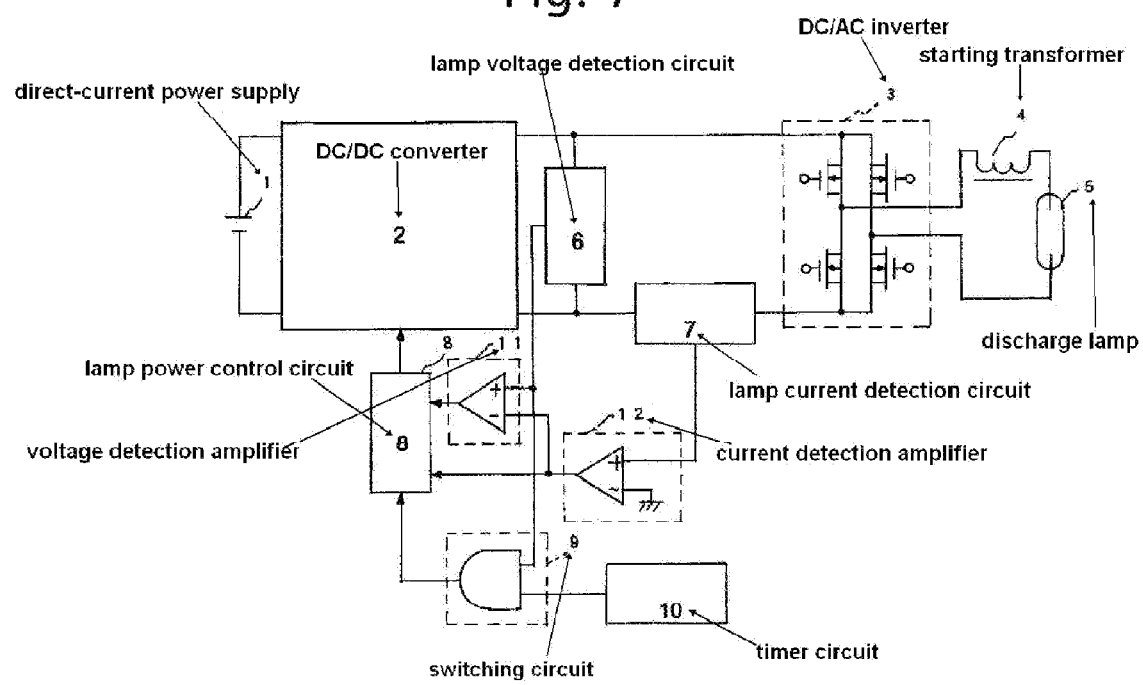
FIG. 7 is a block diagram showing the circuit configuration of a second exemplary embodiment made in accordance with principles of the invention.

FIG. 7 shows a circuit configuration into which a lamp voltage correction circuit is incorporated. In FIG. 7, the reference numeral 11 represents a voltage detection amplifier, and 12 a current detection amplifier. Based on values detected by the voltage detection amplifier 11 and the current detection amplifier 12, the lamp voltage correction circuit can perform its processing for suppressing errors in lamp voltage while reflecting the value of the lamp voltage.

In a circuit for lighting a mercury-free HID lamp, detection errors occurring from a increase in lamp current at starting time and at stable time have effects on the flux start-up control. Then, in the exemplary embodiment of FIG. 7, the discharge lamp lighting apparatus can be provided with the additional lamp voltage correction circuit for reducing detection errors in lamp voltage occurring from an increase in the lamp current at the time of starting the discharge lamp.

The addition of the lamp voltage correction circuit allows the discharge lamp lighting apparatus to optimize the original starting-time control, as well as to make the switching timing of the start-up control described in the embodiment of FIG. 5 appropriate. The detection errors in lamp voltage employed here may be in proportion to the lamp current. Consequently, if the lamp voltage correction circuit corrects the detection value of the lamp voltage, the lamp power control circuit 8 can control the lamp power by using the corrected actual lamp voltage, not the error-containing detection value of the lamp voltage from starting time to stable time.

The lamp voltage correction circuit corrects the detection value of the lamp voltage by using the detection value of the lamp current. More specifically, the lamp power control circuit 8 feeds back the output of the lamp current detection circuit 7 by applying a bias voltage to the lamp voltage detection circuit 6 so as to cancel out increasing errors when the starting current is increased for warm-up at starting time.

The amount of correction to the lamp voltage is in proportion to the detection value of the lamp current. The amount of correction thus peaks under the maximum lamp current at the starting time, and subsequently decreases as the lamp current falls. That is, before the discharge lamp is started, the lamp current is zero and the amount of correction is zero. Due to the provision of this lamp voltage correction circuit according to the exemplary embodiment of FIG. 7, the discharge lamp lighting apparatus can detect the starting-time lamp voltage accurately by using the above described correction method, even if the lamp voltage is detected from the output of the converter including the inverter FET and the starting transformer 4.

As described above, the start-up control circuit of the first exemplary embodiment can be combined with the lamp voltage correction based on the detection value of the lamp voltage according to the exemplary embodiment of FIG. 7. This allows the discharge lamp lighting apparatus to exercise more appropriate warm-up control on the flux start-up characteristic of the mercury-free HID lamp.

Note that while the control circuits can be implemented as analog circuits, microcomputer-controlled circuits may be applied as well. Furthermore, it should be understood that a computer can execute the various control functions described herein, and that a computer can include any electronic device, analog or digital, that is capable of performing the circuit functions described herein. For example, the computer can be a micro-computer, a programmable logic controller, a plurality of analog circuit components, a solid state circuit, etc.

In this case, the timer intended for the control switch timing may be effected by using CR time constants formed by capacitors and resistors, or a clock-based timer output in the case of microcomputer control or the like. Detection values may be corrected through feedback by applying a bias voltage from the output of the lamp current detection circuit 7 to the lamp voltage detection circuit 6.

For control operations, the lamp power control circuit 8 sets a lamp current target value based on the lamp voltage corrected by the lamp voltage correction circuit. That is, in a basic control, the converter output is controlled so that the lamp current target value and the detection value of the current coincide with each other. Then, the detection value of the lamp voltage, or the reference, is changed for the sake of correction according the output of the detection value of the lamp current. This makes the operation a little more complicated than when no correction is effected, whereas the feedback control itself functions stably to prevent the lamp lighting control from becoming unstable.

With microcomputer control, the correction may be performed by a detection circuit prior to AD-converter input. Alternatively, after AD-converter input, the microcomputer may capture the data before the detection value of the lamp voltage is corrected based on the detection value of the lamp current.

Accordingly, programs for making a computer execute codes coding all of or part of the control method, computer-readable recording media containing the programs stored therein, a combination of part of these functions with an electronic circuit, and the like may be included in or encompass the lighting apparatus.

Next, description will be given of the effects of the discharge lamp lighting apparatuses according to the foregoing exemplary embodiments.

In general, mercury-free HID lamps have a stable-time lamp voltage of 42 V, which is generally half as high as that of mercury-containing HID lamps already used for vehicle headlamps, or 85V. For this reason, mercury-free HID lamps show only small differences between the lamp voltages at starting time and at stable time if the detection value of the lamp voltage includes errors. This has made it extremely difficult to control the starting power.

Moreover, the stable-time lamp voltage varies within 42 V±9 V or so. When the starting current is controlled in accordance with the lamp voltage, the variations are also combined with detection errors of the lamp voltage. It has thus been difficult to exercise an appropriate start-up control.

Take, for example, the case of controlling a quick start-up of luminous flux based on the lamp voltage. At stable time, the lamp voltage is as low as 42 V. Immediately after the start of discharge, the lamp voltage has a range of variations of ±5V with respect to 25 V. Provided that the same control is applied, a lamp having a lamp voltage of 20 V immediately after start-up undergoes a maximum current for a relatively long period, while a lamp of 30V immediately after start-up undergoes a maximum current for a relatively short period. This produces large variations in the flux start-up characteristic on a lamp by lamp basis.

Then, in the above described discharge lamp lighting device, the condition on the elapsed time of lighting is added to the condition on the lamp voltage so that the control domain can be switched at arbitrary timing. This makes it possible to improve start-up variations of luminous flux ascribable to variations in lamp voltage which occur when a flux start-up control is performed in accordance with the lamp voltage alone.

In conventional discharge lamp lighting apparatuses, the lamp voltage is detected from the converter output. When the lamp current increases at starting time, the detected amplifier voltage thus grows in detection errors due to the winding resistance of the starting transformer and the ON resistance of the inverter FET. This has made the flux start-up control difficult.

Besides, mercury-free HID lamps originally have low lamp voltages, so that the lamp voltages at starting time and at stable time, even if detected, have only small differences. This has made the starting-time control based on the lamp voltage difficult.

Then, the lamp voltage correction circuit can feed the lamp current detection signal from the lamp current detection circuit 7 back to the lamp voltage detection circuit 6 for the sake of application of a bias voltage, while controlling the discharge lamp 5 from the starting time to the stable time. In other words, the start-up control circuit is combined with the correction on the lamp voltage detection. As a result, the lamp power control circuit 8 can detect the lamp voltages at starting time and at stable time accurately. This allows more appropriate warm-up control on mercury-free HIDs.

While there has been described what are at present considered to be exemplary embodiments of the invention, it will be understood that various modifications may be made thereto, and it is intended that the appended claims cover all such modifications as fall within the true spirit and scope of the invention.

What is claimed is:

1. A discharge lamp lighting apparatus comprising:
   a lamp voltage detection circuit configured to detect a lamp voltage of a discharge lamp;
   a lamp current detection circuit configured to detect a lamp current of the discharge lamp;
   a lamp voltage correction circuit, including a lamp voltage detection amplifier and a lamp current detection amplifier for suppressing errors in the detected lamp voltage; and
   a control circuit configured to perform a starting-time control that applies at least one of a current and power that is greater than a corresponding rated value of the discharge lamp, respectively, in order to light the discharge lamp substantially instantaneously, the control circuit also configured to perform a stable-time control to light the discharge lamp at a substantially constant rated power, and wherein
   the control circuit is configured to control at least one of lamp current and lamp power from a starting time to a stable time in accordance with a voltage value detected by the lamp voltage detection circuit, and the control circuit is configured to switch from the starting-time control to the stable-time control depending on an increase in the voltage value detected by the lamp voltage detection circuit from the starting time to the stable time and depending on a lapse of an arbitrary time from the starting time to a time greater then zero.

2. The discharge lamp lighting apparatus according to claim 1, further comprising:
   a timer configured to determine the lapse of arbitrary time since the discharge lamp is lit, the timer having a different time constant for charging and discharging, respectively, where the time constant for charging is greater than the time constant for discharging.

3. The discharge lamp lighting apparatus according to claim 2, wherein the lamp current detection circuit is configured to feed back a lamp current detecting signal to the lamp power control circuit to apply a bias voltage during control from the starting time to the stable time of the discharge lamp.

4. The discharge lamp lighting apparatus according to claim 1, wherein the lamp current detection circuit is configured to feed back a lamp current detecting signal to the lamp power control circuit to apply a bias voltage during control from the starting time to the stable time of the discharge lamp.

5. The discharge lamp lighting apparatus according to claim 1, wherein at least one of the current and the power applied by the control circuit during starting-time control is several times greater than the corresponding rated value of the discharge lamp, respectively.

6. A discharge lamp lighting apparatus comprising:
a lamp voltage detection circuit configured to detect a lamp voltage of the discharge lamp;
a lamp current detection circuit configured to detect a lamp current of the discharge lamp;
a lamp voltage correction circuit, including a lamp voltage detection amplifier and a lamp current detection amplifier for suppressing errors in the detected lamp voltage; and
a control circuit configured to perform a starting-time control that applies at least one of a current and power that is greater than a corresponding rated value of the discharge lamp, respectively, in order to light the discharge lamp substantially instantaneously, the control circuit also configured to provide a stable-time control for lighting the discharge lamp stably at substantially constant rated power, and wherein
the control circuit is configured to control at least one of the lamp current and the lamp power from a starting time to a stable time in accordance with a voltage value detected by the lamp voltage detection circuit, and
the lamp current detection circuit is configured to feed back a lamp current detecting signal to the lamp power control circuit to apply a bias voltage during control from the starting time to the stable time.

7. The discharge lamp lighting apparatus according to claim 6, wherein at least one of the current and the power applied by the control circuit during starting-time control is several times greater than the corresponding rated value of the discharge lamp, respectively.

8. The discharge lamp lighting apparatus according to claim 6, further comprising:
a timer configured to determine the lapse of arbitrary time since the discharge lamp is lit, the timer having a different time constant for charging and discharging, respectively, where the time constant for charging is greater than the time constant for discharging.

9. The discharge lamp lighting apparatus according to claim 6, wherein the lamp current detection circuit is configured to feed back a lamp current detecting signal to the lamp power control circuit to apply a bias voltage during control from the starting time to the stable time of the discharge lamp.

10. A discharge lamp lighting apparatus comprising:
an application unit for applying a voltage and a current to a discharge lamp;
a detecting unit for detecting a lamp voltage and a lamp current applied to the discharge lamp;
a correction unit for suppressing errors in the detected lamp voltage;
a control unit for performing a starting-time control for controlling a value of at least one of the current and power to a predetermined value exceeding a corresponding rated value of the discharge lamp based on the detected lamp voltage, and a stable-time control for controlling the value of the lamp current so that at least one of the current and power has the corresponding rated value; and
a switching unit for switching between the starting-time control and the stable-time control when the lamp voltage reaches or exceeds a predetermined voltage value and a predetermined time has elapsed since lighting.

11. The discharge lamp lighting apparatus according to claim 10, further comprising:
a timer configured to determine the lapse of arbitrary time since the discharge lamp is lit, the timer having a different time constant for charging and discharging, respectively, where the time constant for charging is greater than the time constant for discharging.

12. The discharge lamp lighting apparatus according to claim 10, wherein the lamp current detection circuit is configured to feed back a lamp current detecting signal to the lamp power control circuit to apply a bias voltage during control from the starting time to the stable time of the discharge lamp.

13. A discharge lamp lighting method comprising:
applying a voltage and a current to a discharge lamp;
detecting a lamp voltage and a lamp current applied to the discharge lamp;
suppressing errors in the detected lamp voltage;
performing a starting-time control by controlling a value of at least one of the current and power to be a predetermined value exceeding a corresponding rated value of the discharge lamp based on the detected lamp voltage;
performing a stable-time control by controlling the value of the lamp current so that at least one of the current and power has the rated value; and
switching between the starting-time control and the stable-time control when the lamp voltage reaches or exceeds a predetermined voltage value and a predetermined time has elapsed since applying the voltage and current to the discharge lamp.

14. The discharge lamp lighting method according to claim 13, further comprising:
feeding back a lamp current detecting signal to a lamp power control circuit and applying a bias voltage during a time period from starting time control to stable time control of the discharge lamp.

15. The discharge lamp lighting method according to claim 13, further comprising:
providing a timer configured to determine the lapse of time since applying the voltage and current to the discharge lamp, the timer having a different time constant for charging and discharging, respectively, and the time constant for charging is greater than the time constant for discharging.

16. A discharge lamp lighting method in which a computer executes:
applying a voltage and a current to a discharge lamp;
detecting a lamp voltage and a lamp current applied to the discharge lamp;
suppressing errors in the detected lamp voltage;
performing a starting-time control by controlling a value of at least one of the current and power to a predetermined value exceeding a corresponding rated value of the discharge lamp based on the detected lamp voltage;
performing a stable-time control by controlling the value of the lamp current so that at least one of the current and power has the corresponding rated value; and
switching between the starting-time control and the stable-time control when the lamp voltage reaches or exceeds a predetermined voltage value and a predetermined time has elapsed since applying the voltage and current to the discharge lamp.

17. A computer-readable medium for use with a discharge lamp that has at least one of a rated current and a rated power, the computer readable medium having a program for making a computer execute:
applying a voltage and a current to a discharge lamp;
detecting at least one of a lamp voltage and a lamp current applied to the discharge lamp;

suppressing errors in the detected lamp voltage;
performing a starting-time control to control a value of at least one of the current and power to a predetermined value exceeding the rated value thereof based on the detected lamp voltage;
performing a stable-time control to control the value of the lamp current so that at least one of the current and the power has the rated value thereof; and
switching between the starting-time control and the stable-time control when the lamp voltage reaches or exceeds a predetermined voltage value and a predetermined time has elapsed since applying the voltage and current to the discharge lamp.

* * * * *